H. C. W. HEERS.
Self-Dropping Attachment for Corn-Planter.
No. 224,826. Patented Feb. 24, 1880.
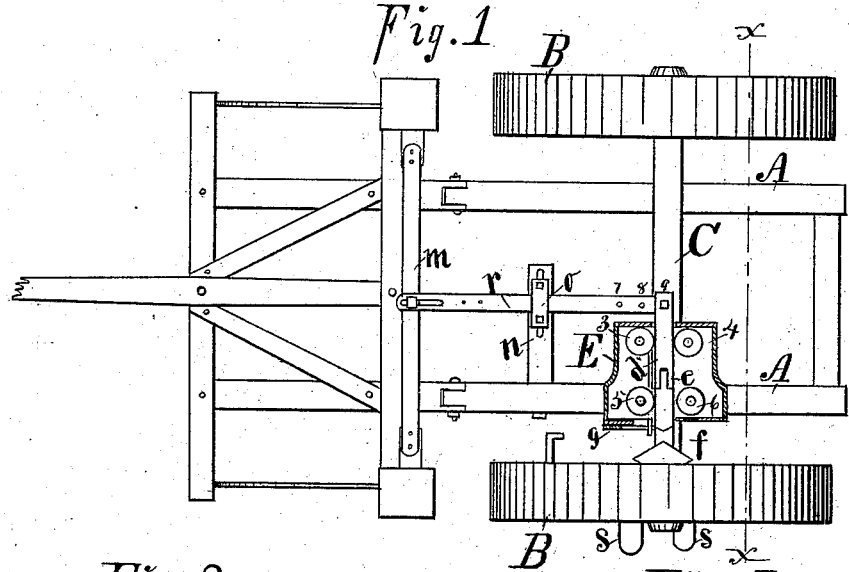
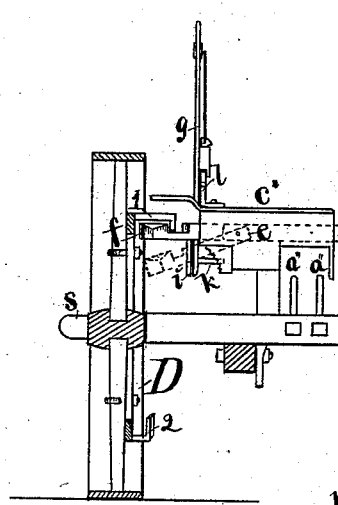
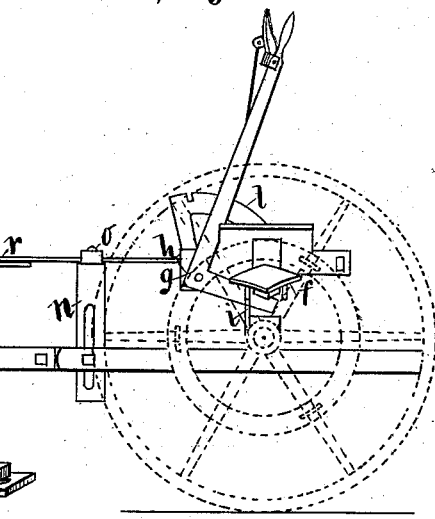
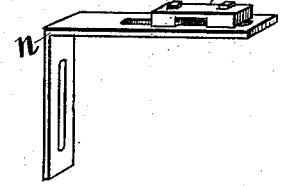
Witnesses:
Thomas G. Orwig,
Erastus W. Smith.
Inventor:
Henry C. W. Heers,
By Frank W. Heers,
Attorney
N. PETERS, PHOTO-LITHOGRAPHER, WASHINGTON, D. C.

United States Patent Office.

HENRY C. W. HEERS, OF DES MOINES, ASSIGNOR OF ONE-HALF OF HIS RIGHT TO JOHN BERG, OF GRINNELL, IOWA.

SELF-DROPPING ATTACHMENT FOR CORN-PLANTERS.

SPECIFICATION forming part of Letters Patent No. 224,826, dated February 24, 1880.

Application filed September 10, 1879.

*To all whom it may concern:*

Be it known that I, HENRY C. W. HEERS, of Des Moines, in the county of Polk and State of Iowa, have invented an Improved Self-Dropping Attachment for Corn-Planters, of which the following is a specification.

The object of my invention is to economize time and labor in planting corn and other field crops in check-rows or drills.

It consists in the combination and arrangement of a cam-ring upon the carriage-wheel, a trapezoidal cross-head, a jointed slide and anti-friction rollers, a bench, a segmental rack, a crank-lever, an adjustable bracket, and a bifurcated pivoted lever, in such a manner that the seed-slide will be automatically operated to drop seeds simultaneously in two parallel rows and at regular intervals of time and space, or at different distances apart, as required in drilling, all as hereinafter fully demonstrated.

Figure 1 of my drawings is a top-plan view of a corn-planter showing my improvement attached. Fig. 2 is a sectional view showing the position and indicating the movements of the jointed slide. Fig. 3 is a side view. Fig. 4 is a perspective view of a slotted right-angle bracket. Together they clearly illustrate the construction, application, and operation of my complete invention.

A A represent the frame of the rear carriage of a planter. B B are the carriage-wheels, mounted upon the axle C of the rear carriage-frame. D represents an iron band or ring fixed on the inside of one of the carriage-wheels B. It has two or more cams, 1 2, cast complete upon the ring, or they may be detachably connected by means of bolts. The cams are of different length and form, adapting them to push and pull, to automatically operate a jointed slide as the carriage advances.

To adapt my invention for the purpose of drilling I simply increase the number of cams upon the ring D, to cause the planter to drop seeds at closer intervals of time and space, as required in planting a field in drills.

E represents a suitable bench, rigidly secured, by means of bolts passed through slots $a''$ $a''$ in an extension, $b''$, of the bench, to the side of the axle C. It may vary in size and form as desired. $c''$ is a top plate or cover of the bench E, that prevents dirt from falling into the slide when the planter is in operation.

$d''$ is a slide that has a joint, $e''$, in its center, adapting it to be raised and lowered by means of a crank-lever that throws it in and out of gear, as required, in turning at the end of a field or traveling on the road. $f$ represents a head, of trapezoidal form, on the end of the jointed slide $d''$, that performs the functions of a duplex cam, engaging the cams 1 and 2 on the ring D, to impart a reciprocating motion to the slide as the wheel B advances over the ground.

3 4 5 6 are anti-friction rollers, one of which is mounted upon each corner of the bench E, that form suitable bearings for the slide $d''$ and prevent binding or wearing.

$g$ represents an elbow-crank lever pivoted on an extension, $h$, of the bench E. Its shortest end extends through a bifurcated extension, $i$, of the bench, and beneath the jointed slide. It has a plate, $k$, on its end, that forms a bearing for the slide on its bottom side when in gear and a support when out of gear.

$l$ is a segmental rack rigidly fixed upon the top of the bench E, to engage the crank-lever $g$, so that the operator can readily throw the jointed slide in and out of gear.

$m$ represents a reciprocating seed-slide mounted upon the front carriage, that simultaneously opens and closes the valves of the seed-boxes.

$n$ is a right-angle bracket. It has slots cut in its top and side faces, and a block, $o$, having its center on the bottom side partially removed, forming a recess for a lever when bolted upon the bracket $n$.

$r$ is a long lever, that has a pivotal bearing upon the bracket $n$, and is connected at its rear end to the bifurcated end of the jointed slide that is mounted upon the rear carriage, and its bifurcated and slotted front end to the center of the seed-slide $m$, mounted upon the front carriage. By means of the bifurcated and slotted end the lever is allowed longitudinal play, as required, to conform with the movements of the flexibly-connected carriages and to prevent any binding or friction that would otherwise interfere with the vibratory motion of the lever.

*s s* represent markers bolted opposite each other on the periphery of one of the carriage-wheels B, to make marks or impressions in the ground in line with the places where the seeds were dropped every half-revolution of the carriage-wheels as the planter advanced across a field.

In the practical operation of my invention, the seed-boxes first being filled with corn and the horses hitched to the front carriage, the driver takes his seat upon the rear carriage. He then pushes the crank-lever *g* forward to the uppermost notch in the segmental rack *l*, and, starting his horses, moves the planter, which causes the cams upon the ring D, that is fixed upon the carriage-wheel B, to engage the jointed slide *d″* upon the bench E, and connected with the lever *r*, to impart a reciprocating rectilinear motion to the seed-slide *m*, that opens and closes the valves in the seed-boxes, thereby automatically dropping the seeds in two parallel rows at regular intervals of time and space, so that the corn can be cultivated both ways, or drop the seeds at closer intervals of time and space, as the planter advances for the purpose of drilling.

I am aware that a ring having studs projecting from its periphery and adapted to engage a pivoted lever at its front end in such a manner as to impart an oscillating motion to the lever connected at its rear end to one end of a seed-slide has been used; but by thus connecting the operative mechanism with the seed-slide more power is required to operate the slide than when attached at its center, and the friction will be thereby increased upon the front end of the lever, where it will become readily worn and useless by the successive striking and rubbing of the studs. Two parallel rings, framed together by means of connecting-bars, have also been used. They have an incline projecting from the inside face of each one of them, adapted to engage a projecting finger on the end of a sliding bar that has its bearing on the lower side of the frame and a stud or pin in its center, to which a pivoted lever is attached that has a slot at its end, allowing the lever to vibrate upon its pivot, and is connected at its opposite end to the seed-slide. The inclines projecting from the rings engage the finger by a downward and pressing motion while in the act of operating the slide-bar, which will bind it to its lower bearings, where it will cut and wear continually, and thereby cause a side draft.

To overcome these objections I construct and fix but a single ring, with two or more cams, as before stated, upon the inside of a carriage-wheel, a slotted and bifurcated lever that has its pivotal bearing upon an adjustable bracket, and connected at its front end to the seed-slide and at its rear end to a jointed slide, carrying a cross-head of trapezoidal form that is mounted and sufficiently elevated upon a suitable bench, and adapted to be engaged and operated by the cam-ring upon the carriage-wheel in such a manner as to diminish the friction and lessen the pressure and wear of the different bearings, and without producing any side draft.

I claim—

A dropping attachment for corn-planters composed of the following elements, to wit: the ring D, having two or more cams fixed upon the carriage-wheel B, in combination with the jointed slide *d″*, carrying a trapezoidal cross-head, *f*, mounted upon the bench E, having anti-friction rollers 3 4 5 6, the pivoted lever *r*, the adjustable bracket *n*, the adjustable block *o*, and the seed-slide *m*, substantially as shown and described.

HENRY C. W. HEERS.

Witnesses:
ERASTUS W. SMITH,
THOMAS G. ORWIG.